(12) United States Patent
Christiaens et al.

(10) Patent No.: US 11,980,129 B2
(45) Date of Patent: May 14, 2024

(54) DEVICE FOR HARVESTING ASPARAGUS GROWING FROM AN ASPARAGUS FIELD

(71) Applicant: A.I.W.M. Christiaens Holding B.V., Melderslo (NL)

(72) Inventors: Angelique Ida Wilma Maria Christiaens, Melderslo (NL); Jozef Petra Maria Christiaens, Melderslo (NL); Martijn Theodorus Marie Smedts, Melderslo (NL); Theodor Lambert Gerardus Aarts, Melderslo (NL)

(73) Assignee: A.I.W.M. CHRISTIAENS HOLDING B.V., Melderslo (NL)

( * ) Notice: Subject to any disclaimer, the term of this patent is extended or adjusted under 35 U.S.C. 154(b) by 521 days.

(21) Appl. No.: 16/924,335

(22) Filed: Jul. 9, 2020

(65) Prior Publication Data

US 2021/0007278 A1   Jan. 14, 2021

(30) Foreign Application Priority Data

Jul. 9, 2019   (NL) .................................... 2023463

(51) Int. Cl.
| | | |
|---|---|---|
| *A01D 45/00* | (2018.01) | |
| *A01B 63/00* | (2006.01) | |
| *A01B 63/02* | (2006.01) | |
| *A01D 34/03* | (2006.01) | |
| *A01D 34/13* | (2006.01) | |
| *A01D 57/20* | (2006.01) | |
| *A01D 57/22* | (2006.01) | |
| *A01G 22/10* | (2018.01) | |

(52) U.S. Cl.
CPC .......... *A01D 45/007* (2013.01); *A01B 63/008* (2013.01); *A01B 63/02* (2013.01); *A01D 34/03* (2013.01); *A01D 34/13* (2013.01); *A01D 57/20* (2013.01); *A01D 57/22* (2013.01); *A01G 22/10* (2018.02)

(58) Field of Classification Search
CPC ........... A01D 34/283; A01D 65/00–08; A01D 57/00; A01D 57/01; A01D 57/02; A01D 57/025; A01D 57/03; A01D 57/04; A01D 57/05; A01D 57/06; A01D 57/12; A01D 57/14; A01D 57/20; A01D 57/22; A01D 57/24; A01D 57/26; A01D 45/007
See application file for complete search history.

(56) References Cited

U.S. PATENT DOCUMENTS

| | | | |
|---|---|---|---|
| 2,791,878 A | 5/1957 | Kepner | |
| 2,942,677 A * | 6/1960 | Gray ..................... | B62D 61/08 180/215 |

(Continued)

FOREIGN PATENT DOCUMENTS

| | | | |
|---|---|---|---|
| CA | 3051641 C | * 11/2020 | |
| DE | 20308242 U1 | * 8/2003 | ........... A01D 45/007 |

(Continued)

*Primary Examiner* — Adam J Behrens
(74) *Attorney, Agent, or Firm* — Myers Bigel, P.A.

(57) ABSTRACT

A device for harvesting asparagus growing from a asparagus field that includes a frame displaceable over the asparagus field by a drive means in which frame is at least provided with cutting means for cutting the asparagus to be harvested close to the surface of the field, and stabilizing means for stabilizing the asparagus relative to the cutting means.

14 Claims, 9 Drawing Sheets

(56) References Cited

U.S. PATENT DOCUMENTS

| | | | | |
|---|---|---|---|---|
| 3,581,483 | A | * | 6/1971 | Kohl .................... A01D 45/007 56/246 |
| 3,653,194 | A | * | 4/1972 | Lachman ............ A01D 45/007 56/327.2 |
| 3,747,312 | A | * | 7/1973 | Duncan ................ A01D 45/007 56/246 |
| 3,753,738 | A | | 8/1973 | Barker |
| 3,760,573 | A | * | 9/1973 | Porter .................. A01D 45/007 56/327.2 |
| 3,893,285 | A | * | 7/1975 | Seeley ................. A01D 45/007 56/327.2 |
| 4,288,970 | A | * | 9/1981 | Wilde .................. A01D 45/007 56/327.2 |
| 4,918,909 | A | * | 4/1990 | Salkeld ................ A01D 45/007 56/327.2 |
| 2016/0235000 | A1 | * | 8/2016 | Haws ................... A01D 45/007 |
| 2018/0177120 | A1 | * | 6/2018 | Haws ................... A01D 45/007 |
| 2020/0375094 | A1 | * | 12/2020 | Calleija ................ A01D 34/412 |
| 2022/0248602 | A1 | * | 8/2022 | Lund .................... F16K 49/002 |

FOREIGN PATENT DOCUMENTS

| | | | | |
|---|---|---|---|---|
| DE | 102007035300 | A1 * | 1/2009 | ........... A01D 45/007 |
| DE | 202012104710 | U1 * | 3/2013 | ............. A01D 34/82 |
| EP | 3031313 | B1 * | 4/2018 | ............. A01D 33/06 |
| WO | WO-9533365 | A1 * | 12/1995 | ........... A01D 45/003 |
| WO | 2019098827 | A2 | 5/2019 | |

* cited by examiner

DEVICE FOR HARVESTING ASPARAGUS GROWING FROM AN ASPARAGUS FIELD

BACKGROUND OF THE INVENTION

The invention relates to a device for harvesting asparagus growing from a asparagus field, comprising a frame displaceable over the asparagus field by means of drive means.

The cultivation of asparagus can be divided in the cultivation of white asparagus in raised asparagus beds formed from soil (so called "hilling" or "earthing up") and the cultivation of green asparagus in a more or less asparagus field. The present invention relates to the cultivation and harvesting of green asparagus from a more or less asparagus field.

The harvesting of both white and green asparagus is a labour-intensive process to date, whereby a mechanical solution with which this can be carried out simply and quickly is not yet entirely available.

SUMMARY

It is therefore the object of the present invention to propose a mechanical solution with which automated green asparagus can be harvested from a asparagus bed with a minimum of effort.

Accordingly a device for harvesting asparagus growing from a asparagus field is proposed, wherein the device comprises a frame displaceable over the asparagus field by means of drive means, which frame is at least provided with cutting means for cutting the asparagus to be harvested close to the surface of the field, and stabilizing means for stabilizing the asparagus relative to the cutting means.

In this way, green asparagus can be obtained effectively and with a high harvesting capacity and quality from a asparagus field. This prevents several workers from having to perform these operations manually.

In an example of the device the cutting means comprise an endless ribbon knife blade which is circulating in the frame, whereas in another example the cutting means comprise a reciprocating ribbon knife blade arranged parallel to the asparagus field in the frame.

In particular the reciprocating ribbon knife is clamped in a cutting frame that can be displaced back and forth in the frame, for example using transmission means as the cutting means might comprise a crank-connecting rod transmission, a gear rack transmission, a chain transmission, or a piston-cylinder transmission.

Herewith a simple and stable cutting technique can be realized on the asparagus field resulting in a high yield of asparagus being harvest with a clean and straight cutting end further reducing cutting loses or avoiding after-harvest cutting operations.

In a further advantageous example of the device according the invention the stabilizing means comprise a rotatable shaft arranged in the frame and parallel to the asparagus field, and a plurality of asparagus-contact elements placed on the shaft. The rotatable stabilizing means assure that the asparagus to be harvest are stabilized in a straight manner by means of the asparagus-contact elements prior to being cut by the cutting means (the cutting ribbon knife blade). Herewith it is being avoided that the asparagus to be cut are pushed flat by the cutting means, and thus incorrect cutting (too short or non-straight cutting) is herewith avoided. This further improves the yield of the asparagus to be harvest as well as reduces cutting loses or avoids after-harvest cutting operations.

In a first example the asparagus-contact elements are made of a flexible material, thus guaranteeing a straight orientation of the asparagus relative to the cutting means but also limiting possible damage to the asparagus.

Furthermore in advantageous embodiments the asparagus-contact elements are designed as non-woven ribbon elements or as brush elements. Also a combination of these embodiments mounted to the same shaft is possible.

Additionally the device may comprise discharge means for discharging the cut asparagus. The discharge means comprise a drivable endless discharge belt arranged obliquely with respect to the asparagus field. Herewith is possible to transport the asparagus being cut up into the device for example towards a work platform placed at the back of the device on which one or more employees can take place for performing the final check and selection operations prior to packaging.

In particular the endless discharge belt is a profiled discharge belt, for example provided with a large number of rims or studs allowing an improved grip on the asparagus being cut for transportation up into the device.

Furthermore the drive means may comprise wheels or caterpillar/crawler tracks, which are each separately drivable and rotatable, which improves the manoeuvrability of the device across the asparagus field.

BRIEF DESCRIPTION OF THE DRAWINGS

The invention will now be explained in more detail with reference to a drawing, which drawing successively shows in.

DETAILED DESCRIPTION

Figure 1A:
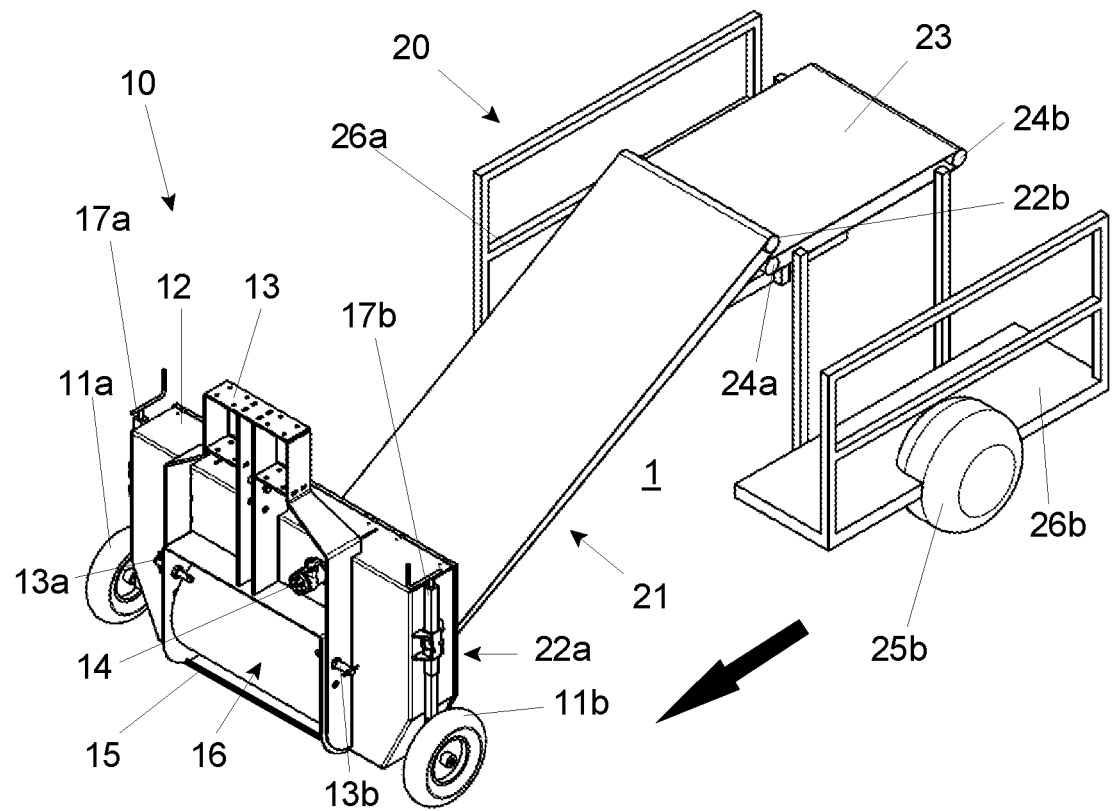
FIGS. 1a and 1b a general overview of embodiments of a device according to the invention.

For a better understanding of the invention, in the following description of the figures all corresponding parts are represented with the same reference numeral.

FIG. 1a disclose a side view of embodiment of an asparagus harvesting device according to the invention. The device is designated by the reference numeral 10 and is composed of a frame 12 which can be moved over a substrate 1 in particular a asparagus field by means of displacement means 11a-11b. The displacement means 11a-11b are here constructed from wheels 11a-11b which can be driven with suitable drive motors.

These drive motor are not shown in FIG. 1a, but can be designed as an electric motor or as a hydraulic motor, which can be conveniently accommodated in the frame 12, and connected to the wheel axis of wheels 11a-11b. In that embodiment the device 10 is capable to be displaced autonomously over the substrate 1. Because each wheel 11a-11b is drivable separately by a drive motor accommodated in the frame 12, the device 10 is very agile and can change direction very quickly and with a short turning circle.

In another embodiment the device 10 is coupled to a tractor (not shown), in particular the frame 12 of the device is connected via coupling 13-13a-13b to the tractor hitch. In another application multiple (two or more) devices 10 can be positioned next to each other and hitched together with one tractor in order to increase the harvesting capacity.

Figure 1B:
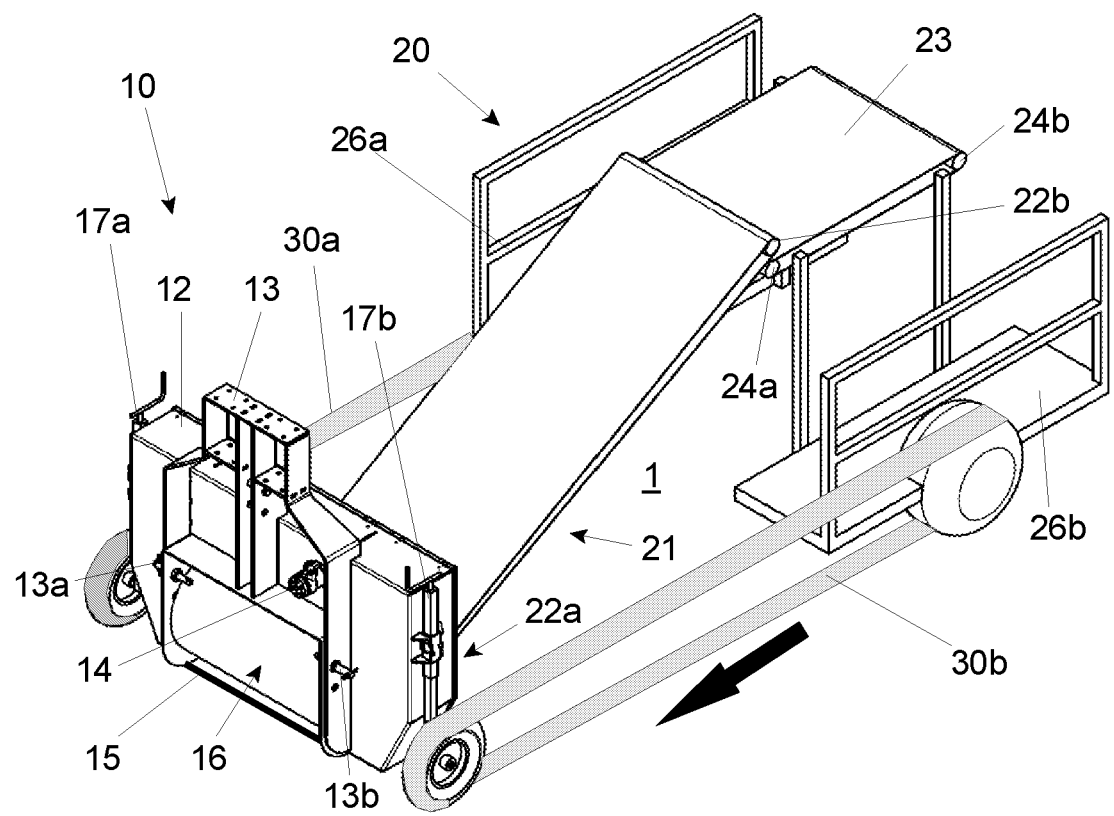

In both embodiments, the device 10 moves (autonomous or towed by the tractor) over the substrate 1 in the direction of the bold arrow in the FIGS. 1a and 1b.

The embodiment of the device 10 being capable of autonomous displacement across the asparagus field, the device 10 is provided on its front side of the frame 12 with search or aiming means (not shown).

The device 10 is further provided with power drive means 14, which can be coupled to the power take-off (PTO) shaft of the tractor to provide power to the cutting means as well as the as will be explained later.

The device is also provided at its rear side (seen in the direction of propagation as depicted by the bold arrow) a work platform 20 mounted on platform wheels 25a-25b. The whole construction of the device 10 and the working platform 20 can be displaced over the asparagus field 1. On the working platform 20 one or more employees can take place in the mounting areas 26a-26b.

Preferably the platform wheels 25a-25b can be driven with suitable drive motors, similar to the wheels 11a-11b. In another embodiment as shown in FIG. 1b, each wheels 11a and 25a (and 11b and 25b) can be replaced by a single caterpillar/trawler track 30a-30b allowing an autonomous displacement of the whole device 10 (frame 12 and platform 20) over the field 1.

In order to be able to harvest asparagus quickly and efficiently from the asparagus bed 1, the device 10 is provided on its front side with cutting means 15 which are accommodated close to the surface level of the asparagus bed 1. The grown asparagus and to be harvested in the asparagus bed 1 are cut close to the surface 1 by means of cutting means 15 and are further transported into the device 10 in the direction of the working platform 20 by means of a discharge belt 21 which is mounted in an angled orientation (oblique manner) relative to the asparagus field or bed 1. Usually asparagus are planted in parallel rows on the field 1 and the device 10 is capable of harvesting several rows of grown asparagus in one harvesting/cutting step. Therefor the device 10 can be moved across the field 1 in such manner that it captures several parallel rows of asparagus simultaneously in front of the cutting means 15.

Figure 4:
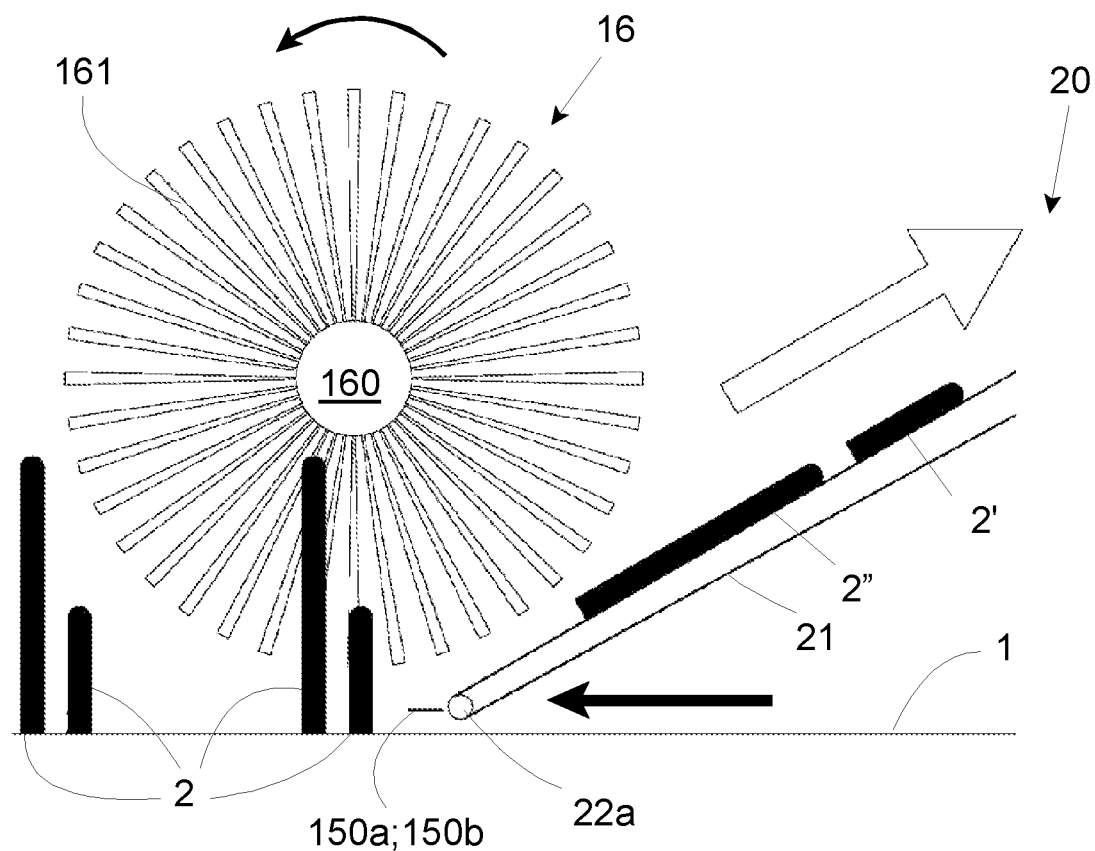
FIG. 4 provides a view of an embodiment of a device according to the invention.
Figure 5:
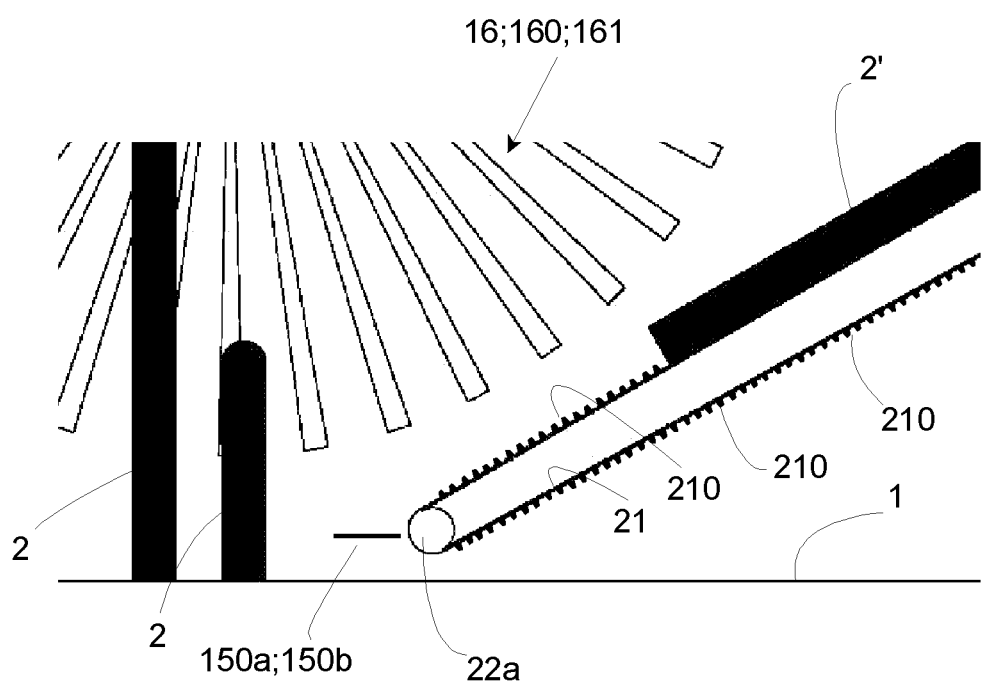
FIG. 5 provides a view of an embodiment of a device according to the invention.

As shown in FIGS. 1a-1b, 4 and 5, the endless discharge belt 21 is accommodated around two transport rollers 22a and 22b, at least one of these transport rollers 22a or 22b being driven by suitable power drive means. The lowest roller 22a is positioned close to the cutting means 15 and in particular close and parallel aligned to the ribbon knife blade 150a or 150b as shown in FIGS. 4 and 5. This configuration allows the asparagus 2'-2" after being cut by the ribbon knife blade 150a or 150b to be collected on the discharge belt 21 thus preventing that the cut asparagus are lost and fall on the field 1.

Optionally, an additional transfer mechanism is present between the cutting means 15 and the discharge belt 21 in order to assure that non cut asparagus 2'-2" are getting lost between the cutting means 15 and the discharge belt 21.

The cut/harvested asparagus 2'-2" being collected on the discharge belt 21, are transported on the discharge belt 21 towards a further endless processing belt 23, which is likewise accommodated around two further transport rollers 24a and 24b, at least one of these further transport rollers 24a or 24b being driven by suitable power drive means. Next to the further endless processing belt 23 of the working platform 20 employees can be positioned on the mounting areas 26a-26b for collecting, sorting and bundling the asparagus in crates or boxes which can also be placed on the working platform 20.

As clearly shown in FIG. 5 the endless discharge belt 21 is a profiled belt. In this embodiment the belt 21 provided with a large number of studs 210 allowing an improved grip on the asparagus 2'-2" being cut for transportation up into the device. However the profiled belt 21 can also be provided with other profiles, such as rims. The discharge belt 21 can also be provided with openings or being an open, woven belt allowing any debris to fall through the openings, whereas the cut asparagus 2'-2" remain on the belt 21 for further processing in the working platform 20.

Figure 2:
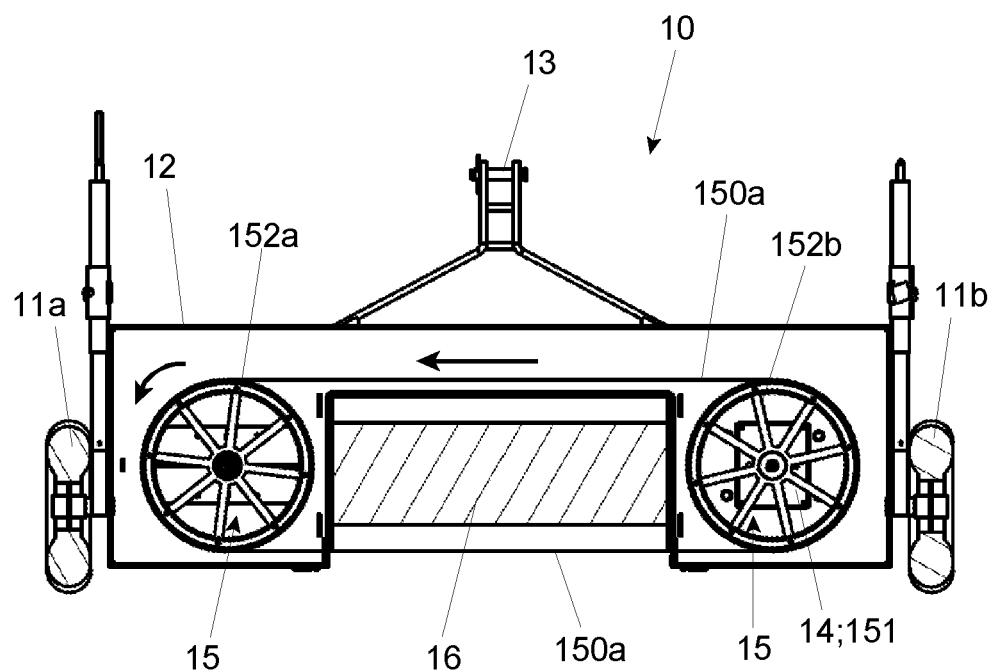
FIG. 2 a first embodiment of a device according to the invention.

FIG. 2 shows a first embodiment of the cutting means 15, which is constructed as an endless ribbon knife blade 150a, which is circulating in the frame 12. To this end the endless ribbon knife blade 150a is mounted to two rotatable pulleys 152a-152b, which are mounted inside the frame 12 at both side of the device 10 thereof, next to each wheel 11a-11b. At least one of the pulleys, here pulley 152b, is driven by means of cutting drive means 151, These cutting drive means 151 can be a separate cutting drive means (a motor or the like) mounted in the frame 12 or be driven by the power drive means 14 (and the power take-off (PTO) shaft of a tractor) via a proper transmission mechanism.

The cutting drive means 151 rotates the endless ribbon knife blade 150a around the pulleys 152a-152b and through the frame 12, such that the lower section of the ribbon knife blade 150a is displaced closely to and across the asparagus field 1. Whilst propagating the device 10 across the asparagus field 1 (autonomous or towed by a tractor) the rotating ribbon knife blade 150a cuts the asparagus 2 sticking from the field 1 close to the surface of the field 1.

Figure 3:
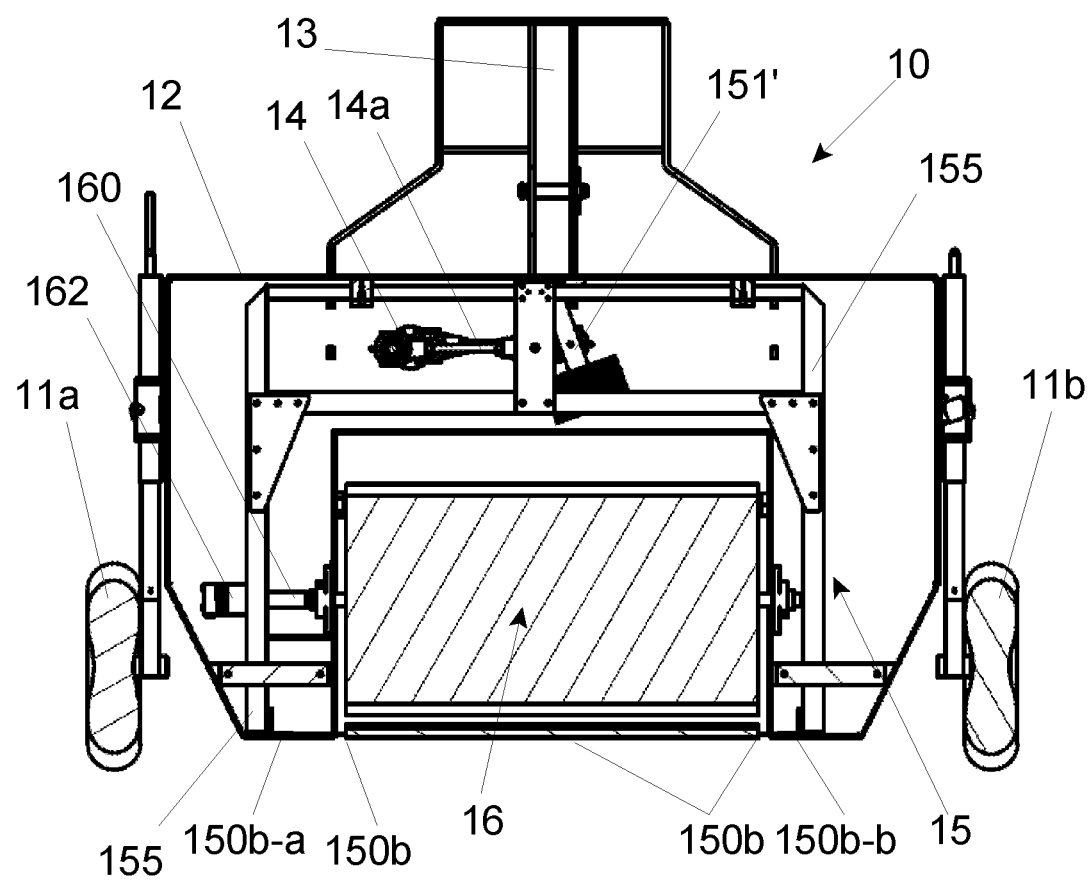
FIG. 3 a first embodiment of a device according to the invention.

FIG. 3 shows a second embodiment of the cutting means 15, which is constructed as a reciprocating ribbon knife blade 150b arranged parallel to the asparagus field 1 in the frame 12. To this end the ribbon knife blade 150b is clamped with each both ends 150b-1 and 150b-b in a cutting frame 155 that can be displaced back and forth (left and right seen in horizontal direction relative to the field 1 in the device frame 12.

The cutting frame 155 is composed of several links or arms forming a rectangular construction in which the ribbon knife blade 150b is tensioned with its ends 150b-1 and 150b-b. The cutting frame 155 can be displaced within the device frame 12 in a reciprocating manner by means of the power drive means 14 and drive axis 14a. The power drive means 14-14a can be constructed as any drive means, for example a crank-connecting rod transmission, a gear rack transmission, a chain transmission, or a piston-cylinder transmission, with reference numeral 151' denoting a counterweight to absorb any reaction forces present in the mechanical construction during use.

The central power drive means 14 is connected to the power take-off (PTO) shaft of a tractor. The rotational movement of the PTO shaft can be converted by the drive axis 14a and the counter weight 151' into a translational, reciprocating movement which is exerted on the cutting frame 155 and the ribbon knife blade 150b. Ribbon knife blade 150b thus performs a reciprocating cutting movement closely above the surface of the field 1 to cut the asparagus 2 to be harvested.

In both embodiments shown in FIGS. 2 and 3 the asparagus 2 are cut by the ribbon knife blade 150a or 150b closely to the surface of the field 1, resulting in a straight cut and a reduced cutting loss.

Reference numerals 17a-17b in FIG. 1 denote height setting or height adjustable means, for example a screw spindle setting device for setting the height of the cutting means 15 (ribbon knife blade 150a and 150b) relative to the surface of the asparagus field 1 so that the desired cutting length of the asparagus 2 to be harvested can be adjusted.

In order to further improve the cutting process of the asparagus 2 by means of the two cutting means shown in FIGS. 2 and 3, stabilizing means 16 are mounted in the device 10/frame 12. The stabilizing means 16 serve to stabilize the asparagus 2 to be cut relative to the cutting means 15 prior to cutting and harvesting thereof.

The stabilizing means 16 comprise a rotatable shaft 160 arranged in the device frame 12 positioned parallel to the asparagus field 1 and perpendicular to the propagation direction (the bold arrow in FIG. 1) of the device 10 across the field 1. On the shaft 160 a plurality of asparagus-contact elements 161 are placed. Preferably, the asparagus-contact elements 161 are made of a flexible material, such as non-woven ribbon elements 161. In another embodiment the asparagus-contact elements 161 are designed as brush elements. Also a combination of several types of asparagus-contact elements 161 (ribbons and bristles) mounted to the shaft 160 is possible.

The rotatable shaft 160 can be rotatably driven by means of stabilizing drive means 162 mounted in the device frame 12. The stabilizing drive means 162 can be a separate electric motor, or be linked via a suitable transmission mechanism to the central power drive means 14, which is in turn connected to the power take-off (PTO) shaft of a tractor.

During propagation of the device 10 across the field 1, the rotating shaft 160 rotates in the direction as shown with the curved arrow in FIG. 4 and will contact the asparagus 2 in such manner that the asparagus 2 are pushed in a backwards direction and in a slight manner against the ribbon knife blade 150a-150b, whilst the device 10 moves in forward direction. Herewith the asparagus 2 are properly positioned against the ribbon knife blade 150a-150b, resulting a clean and straight cutting end further reducing cutting loses and avoiding after-harvest cutting operations.

In particular any asparagus 2 growing in a non-straight manner out of the asparagus field 1 are properly re-aligned relative to the ribbon knife blade 150a-150b due to the brushing action of the asparagus-contact elements 161 (ribbons and/or bristles). Also it is herewith avoided that any asparagus 2 is being pushed down prior to the cutting thereof, which might result in a non-straight cut or even in an incomplete cutting or the cutting of only the upper part of the asparagus 2, leaving a major part of the asparagus 2 still rooted in the field 1.

The length of the asparagus-contact elements 161 is preferably 25-45 cm in particular 25-35 cm allowing the device 10 to be used for harvesting asparagus 2 of a significant length.

The rotation speed of the shaft 160 (driven by the stabilizing drive means 162) is preferably a fixed rotation speed of 30-150 rpm, preferably 40-100 rpm, and more preferably 50-80 rpm, which rotation speed is suitable for a propagation speed of approx. 0.5-10 km/hr of the harvesting device 10 across the field 1.

In another embodiment the rotation speed of the shaft 160 can be adjusted automatically based in the propagation speed of the harvesting device 10 across the field 1 in order to realize the optimal stabilization of the asparagus 2 relative to the cutting means 15 (ribbon knife blade 150a and 150b). Herewith the device 10 is provided with a control unit in the frame 12 which measures the speed of propagation of the harvesting device 10 (during autonomous propagation or during towing by a tractor) and controls the rotation speed of shaft 160 by a proper actuation of the stabilizing drive means 162.

Figure 6A:
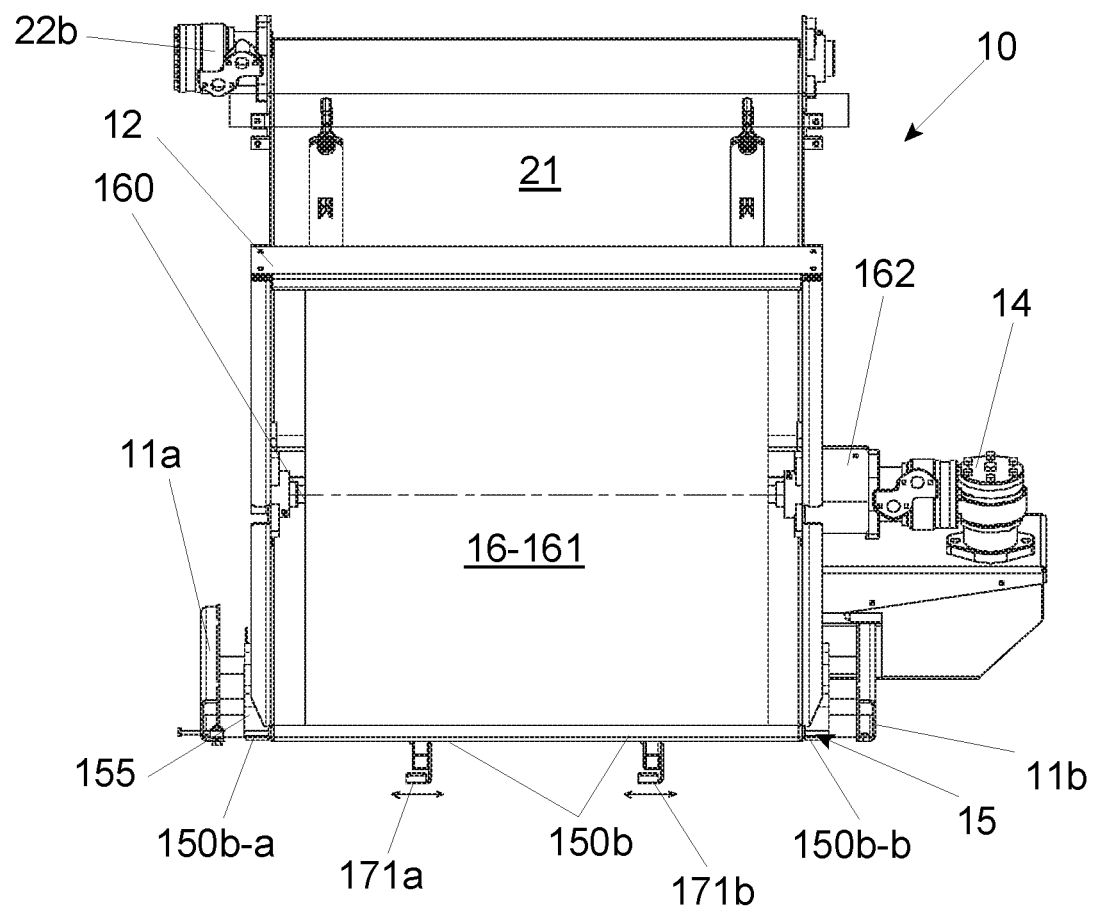
FIGS. 6a, 6b, and 6c detailed views of another embodiment of a device according to the invention.
Figure 6B:
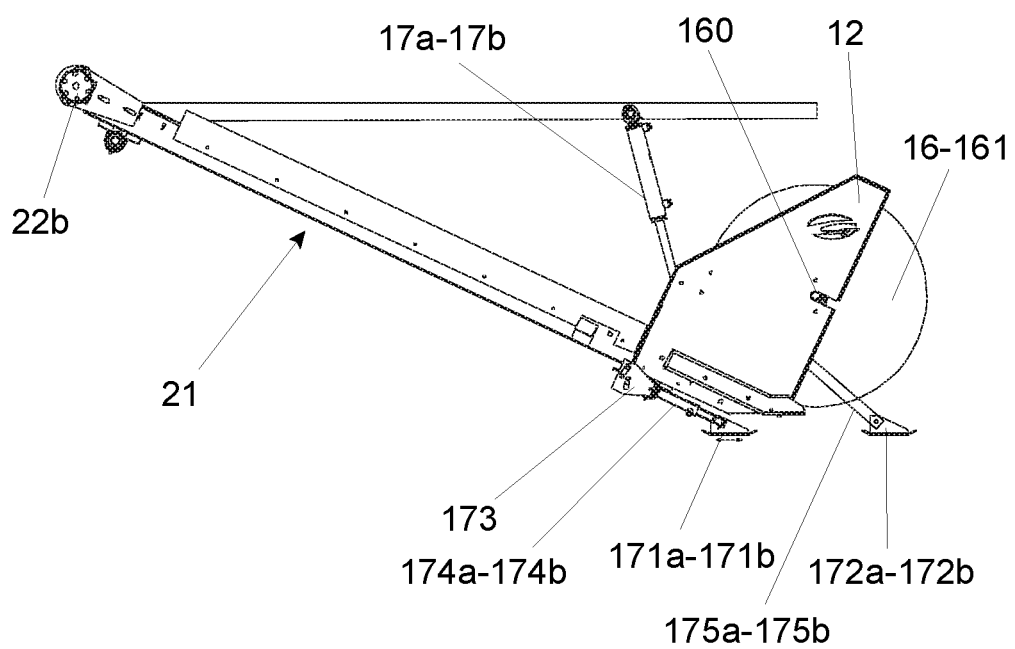
Figure 6C:
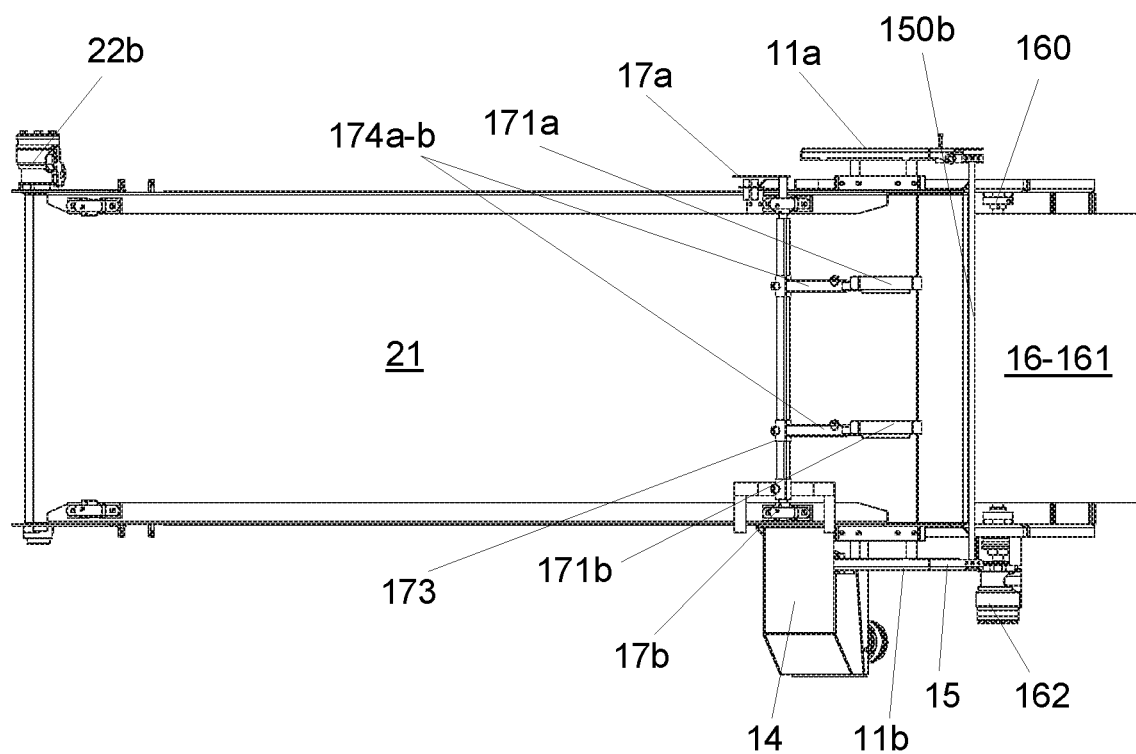

FIGS. 6a-6c show detailed views (front, side and under view) of another embodiment of a device 10 according to the invention. Also in these Figures corresponding parts as depicted in the first embodiment and FIGS. 1-5 are represented with the same reference numeral.

FIG. 6a shows a front view of a slightly different construction of the frame 12 with the central power drive means 14 positioned lower (closer) towards the asparagus field and more or less at the same level of the axis 160 of the stabilizing means 16-161. This guarantees a better handling of the device when propagating over the asparagus field (lower point of gravity) and a more direct driving of the several moving parts of the device, such as the cutting means, etc. However the central power drive means 14 can be positioned at different locations in the frame 12 of the device, depending on its construction, desired manoeuvrability, and stability.

In FIGS. 6a-6c reference numerals 171a-171b refer to so-called first height followers. The first height followers are shaped as a more or less flat shaped contact surface element, that during operation rests on the surface of the asparagus field and that follows the height difference of that surface. Hereto the first height followers 171a-171b are mounted to support bars 174a-174b, which in turn are connected to a central height transfer axle 173 connected with the height setting means 17a-17b.

This allows the central height transfer axle 173 to rotate around its longitudinal axis based on any changes in the height of the asparagus field surface as sensed by the first height followers 171a-171b, which first height followers 171a-171b will displace continuously up and down in vertical direction, whilst resting on and following the surface contour of the asparagus field.

As is common with agricultural fields, the surface of the asparagus field is barely level, but will exhibit height irregularities. In order to guarantee that the cutting means 15 and in particular the (endless or reciprocating) ribbon knife blade 150a-150b will cut the asparagus to be harvest will a sufficient, correct length or to avoid that the ribbon knife blade 150a-150b will contact the surface of the asparagus field (which might interrupt the movement of the device or even a rupture of the ribbon knife blade 150a-150b, the first height followers 171a-171b will transfer any height difference through the rotation of the central height transfer axle 173 towards the height setting means 17a-17b.

The first height followers 171a-171b are positioned at a downstream position relative to the cutting means 15 and the ribbon knife blade 150a-150b, seen in the propagation direction of the device 10 over the asparagus field.

The rotation of the central height transfer axle 173 is converted by the height setting means 17a-17b in a height adjustment of both the cutting means 15 (the ribbon knife blade 150a-150b) and the axis 160 and thus the stabilizing means 16-161 relative to the surface of the asparagus field.

Herewith it is guaranteed that a) the asparagus to be harvest will be cut at the desired and correct length and b) any contact between the ribbon knife blade 150a-150b and the surface of the asparagus field is avoided.

The position of both first height followers 171a-171b (and their support bars 174a-174b) on the central height transfer axle 173 can be adjusted in the horizontal direction and independently from each other, as clarified by the double arrows near the first height followers 171a-171b in FIG. 6a. Herewith it is possible to set the position of each first height follower 171a-171b in dependence of the orientation of the rows of asparagus being cultivated in the asparagus field, thus guaranteeing that the first height followers 171a-171b contact the surface of the asparagus field, without damaging the asparagus.

An improved height setting mechanism night incorporate, to position the first height followers 171a-171b not at a downstream position relative to the cutting means 15 (in particular the ribbon knife blade 150a-150b), but to position the height followers (now mentioned as 'second height followers' indicated with reference numerals 172a-172b) at an upstream position relative to the cutting means 15 (in particular the ribbon knife blade 150a-150b), as shown in FIG. 6b. These second height followers 172a-172b are similarly shaped as the first height followers 171a-171b, that is a more or less flat shaped contact surface elements. The second height followers 172a-172b also rest during operation on the surface of the asparagus field but then in an upstream position relative to the cutting means 15 (in particular the ribbon knife blade 150a-150b) and follows the height difference of that surface in a similar fashion.

Hereto the second height followers 172a-172b are also mounted to similar hinging support bars 175a-175b, which in turn are connected via the central height transfer axle 173 to the height setting means 17a-17b. The second height followers 172a-172b sense in a similar way as the first height followers 171a-171b due to their continuous up and down movements in vertical direction, whilst resting on and following the surface contour of the asparagus field, any changes in the height of the asparagus field surface directly in front of the cutting means 15 (in particular the ribbon knife blade 150a-150b).

The second height followers 172a-172b sense in a similar manner any height changes in the surface of the asparagus field, and thus in a preventive height adjustment through the height adjustment means 17a-17b of both the cutting means 15 (the ribbon knife blade 150a-150b) and the axis 160 and thus the stabilizing means 16-161 relative to the surface of the asparagus field. Herewith also damage or rupture to the cutting means 15 and/or a too short cutting of the asparagus to be harvested is prevented.

Note that the first and second height followers 171a-171b/172a-172b can be combined.

It is noted that the height followers might also be constructed as light sensors, which detect the height of the asparagus field by means of light reflection. Also a laser device can be implemented as a height detection means, wherein a laser beam being emitted by the laser device is directed to the asparagus field and its reflected part of the beam is used to determine the local height of the asparagus field.

LIST OF REFERENCE NUMERALS 10 asparagus harvesting device
11a-11b displacement wheels
12 frame
13-13a-13b hitch coupling
14 central power drive means
14a drive axis of central power drive means/crank-connecting rod transmission/a gear rack transmission/a chain transmission/a piston-cylinder transmission
15 cutting means
150a endless ribbon knife blade
150b reciprocating ribbon knife blade
150b-1, 150b-b ends of reciprocating ribbon knife blade
151 cutting drive means of endless ribbon knife blade
151' counter weight
152a-152b transport wheels of endless ribbon knife blade
155 frame for reciprocating ribbon knife blade
16 stabilizing means
160 axis of stabilizing means
161 asparagus-contact elements (ribbons and/or bristles)
162 stabilizing drive means for stabilizing means
17a-17b height setting means
171a-171b first height follower
172a-172b second height follower
173 height transfer axle for height setting means
174a-174b support bar for first height follower
175a-175b support bar for first height follower
20 working platform
21 discharge belt
22a-22b transport rollers of discharge belt
23 processing belt
24a-24b further transport rollers of processing belt
25a-25b platform wheels
26a-26b mounting areas
30a-30b caterpillar/trawler tracks

The invention claimed is:

1. A device for harvesting asparagus growing from an asparagus field, comprising a frame displaceable over the asparagus field by means of drive means, which frame is at least provided with cutting means for cutting the asparagus to be harvested close to a surface of the field, and a discharge means for discharging the cut asparagus; stabilizing means positioned above and in front of the cutting means, the stabilizing means configured to orient and stabilize the asparagus against the cutting means to form a cutting surface, the stabilizing means comprise a rotatable shaft arranged in the frame that is parallel to the asparagus field, a plurality of asparagus-contact elements placed on the shaft, wherein the asparagus-contact elements are made of a flexible material.

2. The device of claim 1, wherein the cutting means comprise an endless ribbon knife blade which is circulating in the frame.

3. The device of claim 1, wherein the cutting means comprise a reciprocating ribbon knife blade arranged parallel to the asparagus field in the frame.

4. The device of claim 3, wherein the reciprocating ribbon knife is clamped in a cutting frame structured to be displaced back and forth in the frame.

5. The device of claim 3, wherein the cutting means comprise a crank-connecting rod transmission, a gear rack transmission, a chain transmission, or a piston-cylinder transmission.

6. The device of claim 1, wherein the asparagus-contact elements are designed as non-woven ribbon elements.

7. The device of claim 1, wherein the asparagus-contact elements are designed as brush elements.

8. The device of claim 1, wherein the discharge means comprise a drivable endless discharge belt arranged obliquely with respect to the asparagus field.

9. The device of claim 8, wherein the endless discharge belt is a profiled belt.

10. The device of claim 1, wherein the drive means comprise wheels or crawler tracks, which are each separately drivable and rotatable.

11. The device of claim 1, further comprising height adjusting means for following the surface of the asparagus field and for adjusting the height of the cutting means and the stabilizing means relative to the surface of the asparagus field.

12. The device of claim 11, wherein the height adjustment means comprise at least one height follower resting on the surface of the asparagus field, which at least one height follower senses any change in the height of the surface of the asparagus field and wherein the height adjustment means adjust the height of the cutting means and the stabilizing means based on that height change being sensed.

13. The device of claim 9, wherein the profiled belt is provided with a plurality of studs or rims.

14. The device of claim 1, wherein the stabilizing means is spatially located proximate the cutting means such that the asparagus is capable of being in simultaneous contact with both the cutting means and the asparagus-contact elements of the stabilizing means when forming the cutting surface.

\* \* \* \* \*

UNITED STATES PATENT AND TRADEMARK OFFICE
CERTIFICATE OF CORRECTION

PATENT NO. : 11,980,129 B2  
APPLICATION NO. : 16/924335  
DATED : May 14, 2024  
INVENTOR(S) : Christiaens et al.

Page 1 of 1

It is certified that error appears in the above-identified patent and that said Letters Patent is hereby corrected as shown below:

On the Title Page

References Cited, U.S. PATENT DOCUMENTS, Page 2: Please correct "3,753,738" to read --3,753,736--

Signed and Sealed this  
Twenty-first Day of January, 2025

Coke Morgan Stewart  
*Acting Director of the United States Patent and Trademark Office*